(12) United States Patent
Boegli

(10) Patent No.: US 7,229,681 B2
(45) Date of Patent: *Jun. 12, 2007

(54) DEVICE FOR SATINIZING AND EMBOSSING FLAT MATERIALS

(75) Inventor: Charles Boegli, Marin-Epagnier (CH)

(73) Assignee: Boegli-Gravures S.A., Marin-Epagnier (CH)

( * ) Notice: Subject to any disclaimer, the term of this patent is extended or adjusted under 35 U.S.C. 154(b) by 174 days.

This patent is subject to a terminal disclaimer.

(21) Appl. No.: 10/739,410

(22) Filed: Dec. 19, 2003

(65) Prior Publication Data

US 2004/0151796 A1     Aug. 5, 2004

(30) Foreign Application Priority Data

Dec. 23, 2002  (CH) ..................................... 2206/02

(51) Int. Cl.
| | |
|---|---|
| B32B 3/00 | (2006.01) |
| A01J 21/00 | (2006.01) |
| A24F 15/00 | (2006.01) |
| B31F 1/07 | (2006.01) |
| B21D 13/04 | (2006.01) |

(52) U.S. Cl. ....................... 428/156; 428/187; 425/194; 425/363; 425/367; 206/242; 206/247; 101/6; 101/23; 72/196

(58) Field of Classification Search ................ 428/156, 428/913, 187; 206/242, 247; 425/194, 363; 425/367, 471; 72/196; 101/6, 23
See application file for complete search history.

(56) References Cited

U.S. PATENT DOCUMENTS 4,211,743 A * 7/1980 Nauta et al. ................ 264/284

5,229,186 A  7/1993 Tribble et al.

FOREIGN PATENT DOCUMENTS

| CA | 2425536 | * | 4/2003 |
|---|---|---|---|
| EP | 0 194 042 | | 2/1986 |
| EP | 0 925 911 | | 12/1998 |
| EP | 1 033 228 | | 2/2000 |
| WO | WO 97/13633 | | 4/1997 |
| WO | WO 01/43110 | | 6/2001 |
| WO | WO 02/30661 | | 4/2002 |
| WO | WO 02/076716 | | 10/2002 |

* cited by examiner

*Primary Examiner*—Donald J. Loney
(74) *Attorney, Agent, or Firm*—Foley & Lardner LLP

(57) ABSTRACT

The device for satinizing and embossing flat materials comprises an embossing roll and at least one mating roll, said rolls being connected to a driving system and adapted to be driven individually or in common and to be resiliently pressed against one another while the individual teeth are flattened, and the embossing teeth being designed such as to produce in the corresponding locations of said flat material during its passage embossed marks whose appearance varies according to the viewing angle of the observer and/or the kind and/or the position of the lighting source, the embossing teeth which produce said variable marks having a different geometrical shape and/or surface than the satinizing teeth intended for satinizing. To this end, the surfaces of said embossing teeth and/or portions of the tooth space bottom are provided with microstructures. These microstructures allow producing largely forgery-proof marks which may furthermore provide a very decorative effect.

29 Claims, 7 Drawing Sheets

DEVICE FOR SATINIZING AND EMBOSSING FLAT MATERIALS

This application claims the benefit of priority to Swiss Application No. 2002 2206/02 filed Dec. 23, 2002, the disclosure of which is hereby incorporated by reference in its entirety.

FIELD OF THE INVENTION

The present invention relates to a device for satinizing and embossing flat materials, comprising a first embossing roll and at least one mating roll, said rolls being connected to a driving system and adapted to be driven individually or in common and to be resiliently pressed against one another and the individual teeth of said rolls being flattened, and the embossing teeth being designed such as to produce in the corresponding locations of said flat material during its passage embossed marks whose appearance varies according to the viewing angle of the observer and/or the kind and/or the position of the lighting source, the embossing teeth which produce said variable marks having a different geometrical shape and/or surface than the satinizing teeth intended for satinizing. The invention further relates to a metallized and/or reflecting packaging foil produced with the device of the invention, and to a method for operating the device of the invention.

BACKGROUND OF THE INVENTION

A device of this kind is known from WO 02/30661 to the applicant of the present invention. This reference discloses the use of teeth whose geometrical shape and/or surface deviates from which of the satinizing teeth in order to produce signs with optical effects depending on the viewing position and/or the light source, thereby allowing to produce security features which are very difficult to copy. While the disclosed geometrical deviations of the tooth shapes and height are all comprised in the macroscopic range of 30 to 100 $\mu$m(micrometers), no details are specified with regard to the surface design of the teeth and of the tooth space bottom.

WO 02/076716 to the same applicant discloses devices for the treatment of flat materials in which an embossing roll provided with individual teeth cooperates either with a second mating roll provided with the same toothing and with a mating roll having no individual teeth, or only with a roll having no individual teeth. This allows to achieve particularly precise embossing operations for the above-described effects.

The device for satinizing a foil described in EP-B-925 911 to the applicant of the present invention, which is based on the knowledge from earlier patents of the same applicant, comprises two rolls which are arranged in a mutually displaceable manner such that a self-stabilizing effect results when the teeth of the rolls interpenetrate, thereby providing a high processing speed, on one hand, and a high precision, on the other hand. First of all, this allows a uniform satinizing operation, and with a corresponding machining of the teeth, a highly precise embossing of foils.

EP-A2-0 194 042 discloses an embossed object on the substrate of which first and second optically non-diffractive relief elements defining first and second patterns are embossed, the patterns having a uniform reflectivity and their appearance varying with the viewing angle. The specification discloses line patterns only, and no satinizing is intended.

SUMMARY OF THE INVENTION

An embodiment of the present invention includes a satinizing device which allows embossing a greater variety of optical signs which provide improved falsification security and decoration effects.

This is accomplished by a device wherein the surface of said embossing teeth and/or portions of the tooth space bottom of said embossing roll are provided with microstructures.

BRIEF DESCRIPTION OF THE DRAWINGS

The invention will be explained in more detail hereinafter with reference to drawings of exemplary embodiments.

DETAILED DESCRIPTION OF PREFERRED EMBODIMENTS

Figure 1:
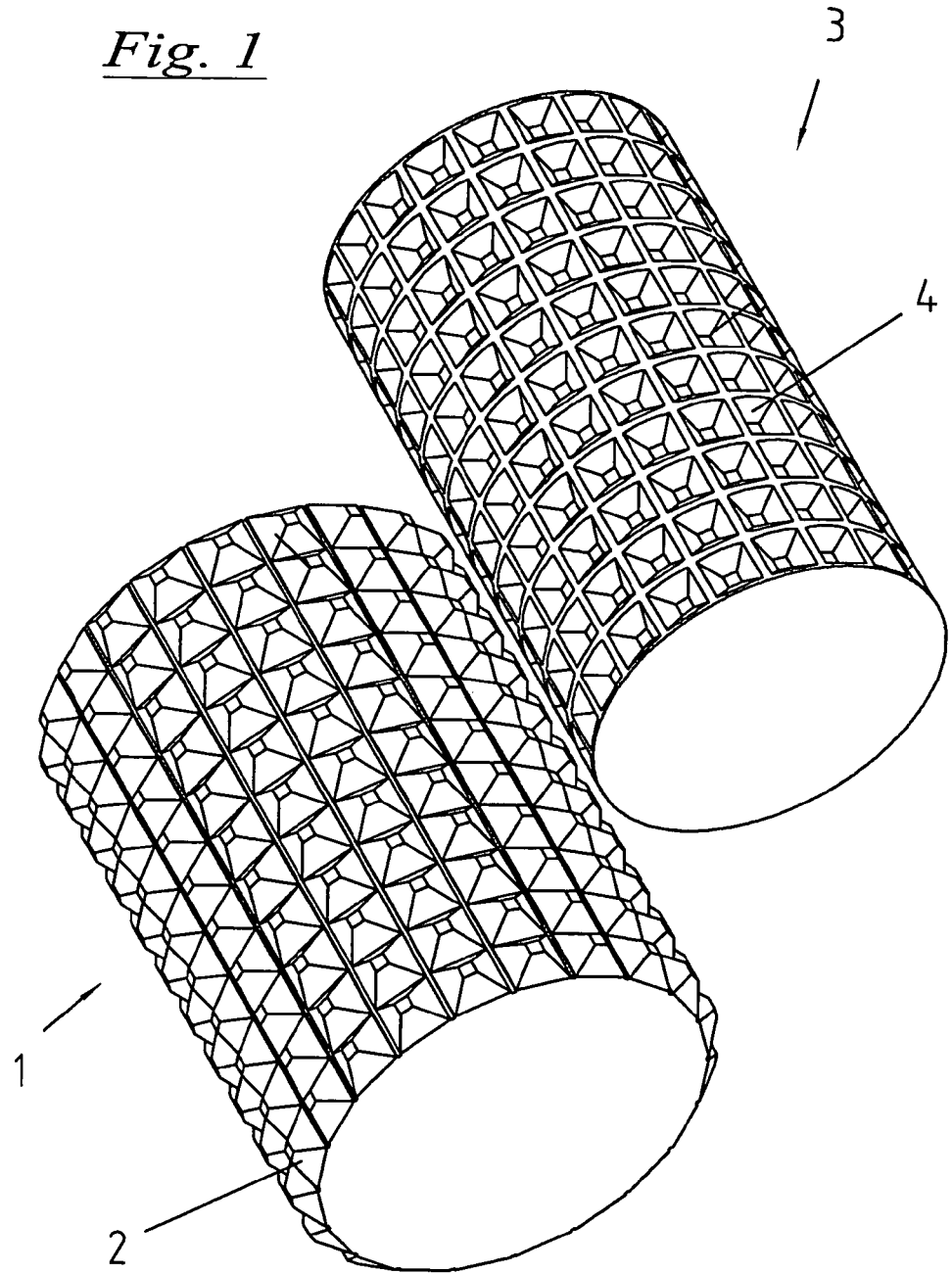
FIG. 1 shows an embossing roll and a mating roll in a so-called pin up-pin down configuration.

In the operation of satinizing aluminium lined paper or metallized foils, or so-called metallized innerliners for the packaging of tobacco products or foods such as chocolates, hereinafter called "foils" for the sake of simplicity, the surface is provided with a very fine, regular grating in the millimeter and submillimeter range in which blank or unsatinized places are left out. While the diffusely shining satinized portions produce the known satin gloss, the reflecting unsatinized portion of the surface is used for logos, inscriptions or the like. In these places, it would be easily possible to produce marks of authenticity.

In the patent applications mentioned in the introduction, methods have been suggested where to the satinizing procedure a second procedure is superimposed for providing the embossed medium with security features which are difficult to copy. The production of these security features was based upon the geometrical dimension of the thickness of the fibrous portion of the foils known in the art at that time, i.e.

in the order of 100 μm. Such effects produced by macroscopic means always have to be viewed in the context of the large satinized surfaces surrounding them. As long as the described embossing devices produce optically active geometries of the order of 100 μm, the latter will result in the reflection and diffraction phenomena known in physics. The contrast ratios obtained in this manner are intrinsically limited with regard to the covering and darkening effect as the fibers in the embossed material have only a limited ability to form obstacles in the path of rays. In this context, ideally, totally reflecting relief patterns are concerned.

Herebelow, the invention will be explained under the aspect that in the development of an embossing device operating in the microscopic range and by an optimum utilization of pressure and of other parameters affecting the embossing operation, it is observed that the patterns which are superimposed in a satinizing process produce excellent security features. To this end, the gratings known from optics are applied to the embossing teeth in a suitable manner and the embossed side of the foils is treated therewith.

Thus, the embossed structures of the invention are produced by positive grating structures, i.e. structures projecting from the tooth surface, or negative ones, with a grating distance of less than one μm (micrometer) up to approx. 30 μm. Depending on their disposition on the embossed material, these grating structures may produce colorless microstructures of the interference type with many diffractive orders or colored phenomena similar to holograms. The obtainable contrast, i.e. the so-called diffractive efficiency, may be very high since metallic surfaces are involved.

With suitable grating distances and viewing angles, it is possible to produce color effects depending on the viewing angle. This is e.g. accomplished with microstructures having a grating distance of 1 to 3 μm at a viewing angle of 30°. As explained below, these microstructures may be combined with the coarser macrostructures according to WO 02/30661 producing reflection effects, thereby allowing for decorative effects such as e.g. rotating points of changing color depending on the viewing position. The microstructures may extend over a larger surface and length, i.e. over the length and surface of the teeth.

Before discussing the core of the invention, i.e. the microstructures provided on the individual teeth of the rolls, examples of possible roll assemblies will be described. In this context, reference is expressly made to the various assemblies described in WO 02/076716, of which only one example is illustrated here. In the present description, the roll driven by the driving system of the device will be called the embossing roll, which accordingly comprises the individual teeth which provide the satinizing effect and, if they are machined, produce the embossing of security features, signs, and decorative effects. In summary, a device comprises rolls, the distinction being made when the structure of the rolls is concerned.

The individual teeth of the rolls may be in the form of truncated pyramids, as illustrated, or frustoconical, or hemispherical, and comprise flattened portions.

FIG. 1 shows a section of embossing roll 1 in a so-called pin up configuration, i.e. the teeth 2 of embossing roll 1 project outwards while the second roll, mating roll 3, comprises corresponding indentations 4. The rolls are arranged such that the teeth of the embossing roll engage in the respective indentations of the mating roll. In this case, an enhanced effect can be achieved if not only the projecting teeth 2 are flattened, but also the bottoms of indentations 4 complementarily have a smaller depth as teeth which are not flattened.

Alternatively, a so-called pin up-pin up configuration can be used where each tooth of the embossing roll engages between four teeth of the mating roll. This combination is mostly used when the driven embossing roll drives the mating roll.

Figure 2:
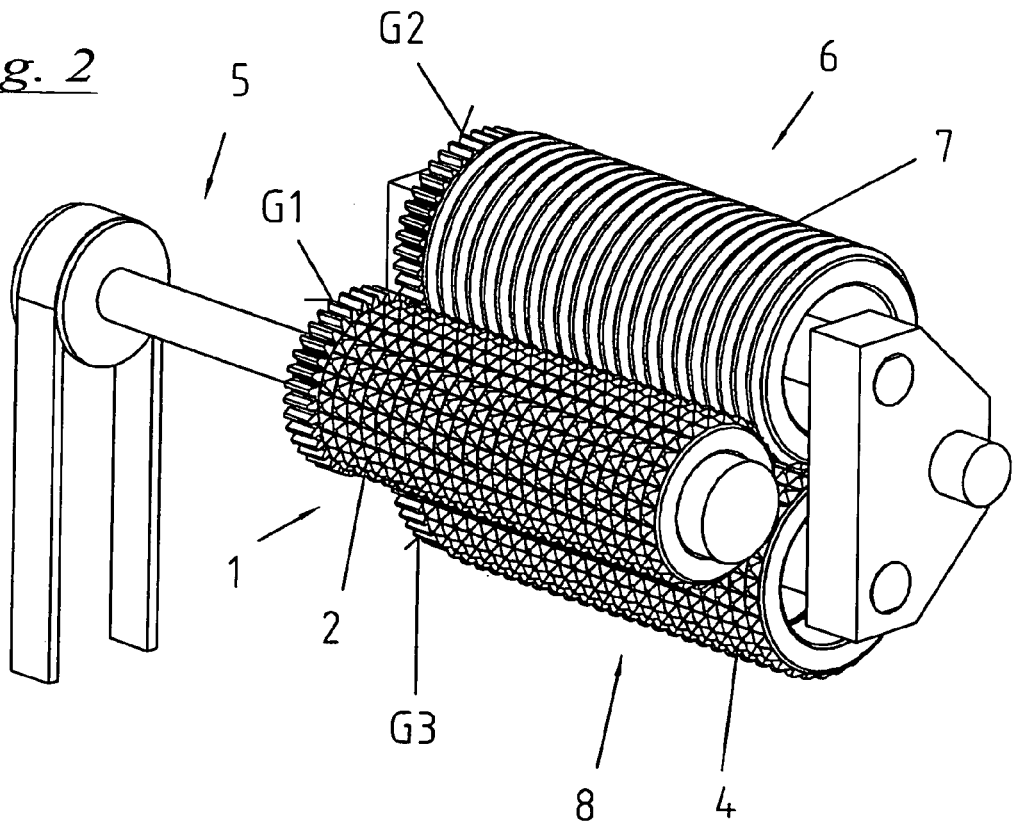
FIG. 2 shows an assembly of three synchronized rolls.

In the exemplary embodiment of FIG. 2, the device with driving unit 5 includes the driven embossing roll 1 and a first mating roll in the form of a roll comprising rings 7 as described in WO 02/076716. The following mating roll 8 either comprises a toothing which is identical to that of embossing roll 1, i.e. the same teeth 2 whose bases are disposed in parallel or transversally to the longitudinal axis or, as illustrated, complementary indentations 4.

Figure 3:
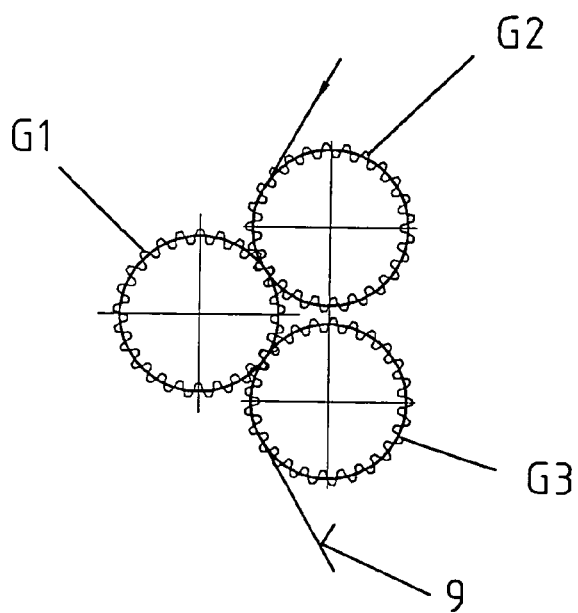
FIG. 3 shows a synchronizing gear for the assembly of FIG. 2.

For embossing special patterns, it may be advantageous to positively synchronize rolls 1 and 8 provided with teeth 2 resp. indentations 4, as it is symbolically indicated in FIG. 3 by gearwheels G1–G3. The gearwheels generally represent synchronizing elements including other synchronizing means known perse in the art, such as electronic components and the like.

Figure 2A:
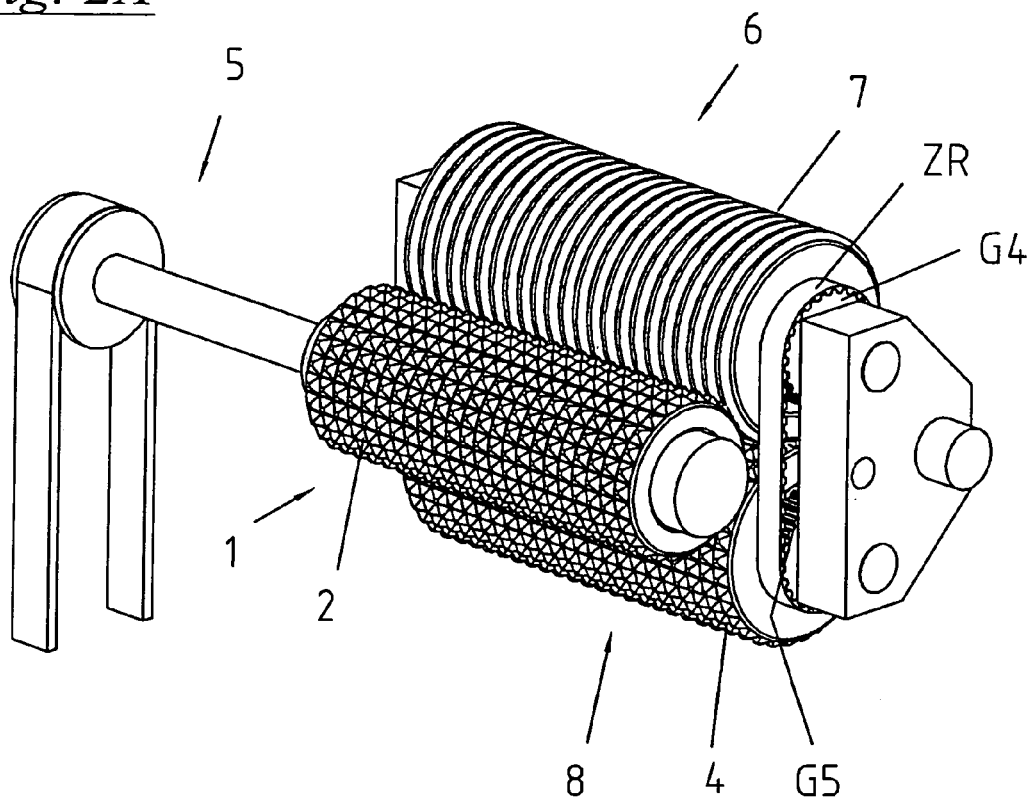
FIG. 2A shows an alternative embodiment of FIG. 2.
Figure 3A:
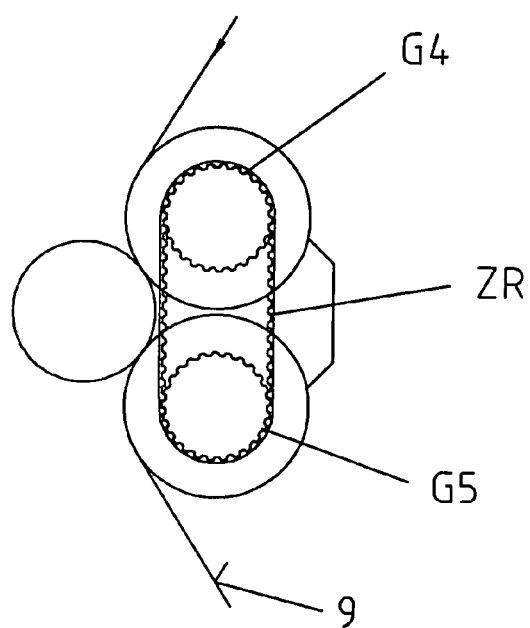
FIG. 3A shows a synchronization of the mating rolls by means of a toothed belt.

As a variant of the embodiment according to FIGS. 2 and 3, a mutual synchronization of the two mating rolls 6 and 8 with drive pulleys G4 and G5 by means of a tooth belt ZR is represented in FIGS. 2A and 3A while the mating rolls themselves are driven by embossing roll 1.

Also, a positive synchronization is particularly advisable if the material 9 is subject to strong distortions in the embossing process. In the following illustrations, the material band 9 passes through the device in such a manner that its metallized surface which is to be embossed is directed towards driven embossing roll 1.

Although in the examples of FIGS. 2 and 3 as well as 2A and 3A all rolls or two of them are positively synchronized, it is also possible to choose the operation where driven embossing roll 1 is supported stationarily and the mating roll comprising teeth is free-wheeling and journalled as described in U.S. Pat. No. 5,598,784. According to this reference, the axles of the rolls are capable of an excursion both in the longitudinal and/or in the pressure direction and/or in the travelling direction of the material. This allows an adjustment of the rolls in view of providing a precise mutual engagement of the teeth and thus a perfect processing of the material without wrinkling it. This is also described in EP-A-0 925 911 to the applicant of the present invention. The excursion of the movably journalled rolls may be adjusted by spring force, pneumatically, or by magnetic forces.

Generally, the driven embossing roll comprises the embossing teeth, which are provided with a macrostructure and/or a microstructure, as described hereinafter, and produce the embossing and satinizing. These embossing teeth are generally pin up teeth. The other rolls, i.e. the mating rolls, may have the most diverse geometrical shapes, i.e. pin up teeth as well, or pin down indentations, radial rings 7, longitudinal ridges, or a smooth rubber surface. Furthermore, as the case may be, some foils may require or allow the structures to be provided on a mating roll rather than on the driven roll.

Figure 4:
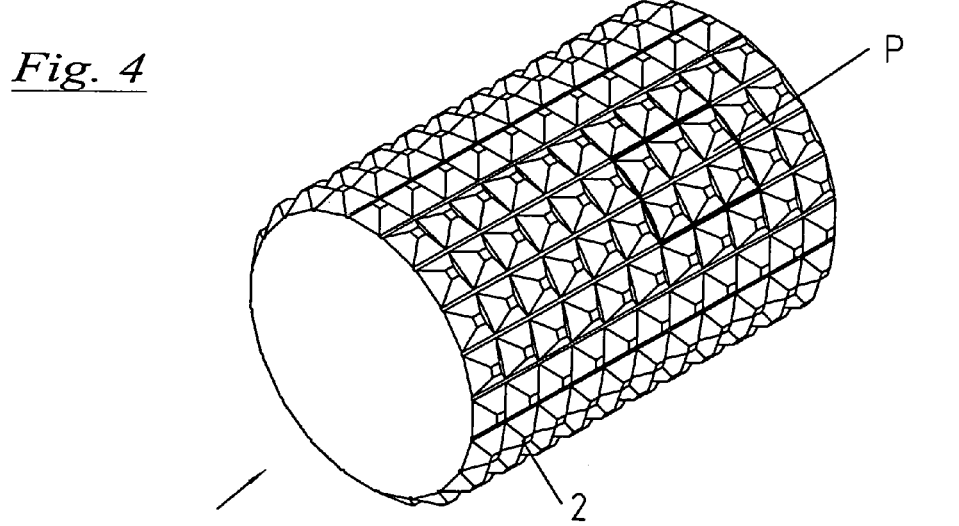
FIG. 4 shows a detail of the embossing roll of FIG. 1 on an enlarged scale.
Figure 5:
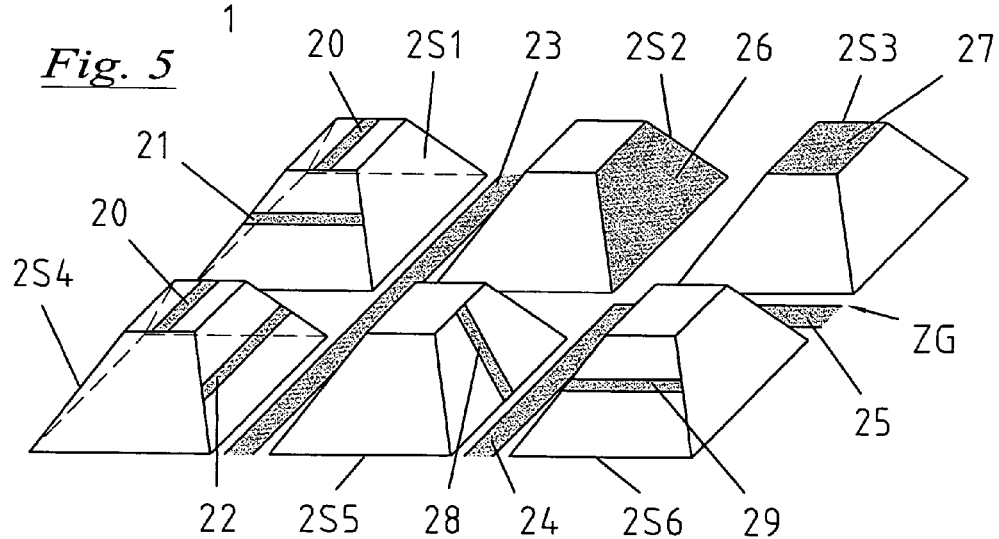
FIG. 5 shows a further enlarged detail of FIG. 4 illustrating microstructures provided on the teeth.
Figure 6:
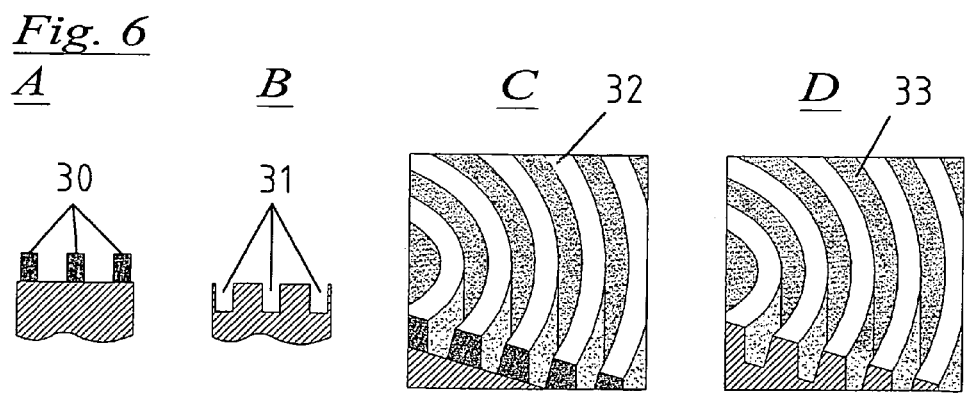
FIGS. 6A–6D show different possible microstructures provided on the tooth surface of FIG. 5 on a still further enlarged scale.

A surface treatment of the individual teeth and of the tooth space bottoms of driven embossing roll 1, called microstructure in the present patent application, is represented in FIGS. 4 to 6. FIG. 4 shows an enlarged detail of a pin up embossing roll 1 with teeth 2 where the portion P illustrated in FIG. 5 is bordered by solid lines. Six teeth 2S1 through 2S6 are represented in FIG. 5, the applied microstructures being hatched. The teeth are illustrated as truncated pyramids whose lateral edges extend in parallel resp. perpendicularly to the longitudinal axis of the roll, and the pyramids are flattened.

Tooth 2S1 comprises a microstructure 20 on the flattened portion of the tooth and a microstructure 21 on one or both transversal sides of the tooth, and tooth 2S4 comprises the same surface structure 20 and a microstructure 22 on one or both longitudinal side(s) of the tooth. Tooth space bottom ZG may comprise a microstructure 23 extending along the longitudinal sides of the teeth or a microstructure 24 extending over a certain length, or a microstructure 25 extending transversally thereto.

Tooth 2S2 is provided on one or both longitudinal sides with a microstructure 26 which extends over its entire side, and tooth 2S3 comprises a microstructure 27 covering the entire surface of its flattened portion. The teeth 2S5 and 2S6 comprise only a narrow microstructure 28 extending across the height of the longitudinal side or a microstructure 29 along the transversal side, respectively. It is understood that various microstructures may be provided in this manner which produce an equally large variety of patterns on the foil.

In FIGS. 6A–D, some examples of possible straight or curved microstructures on top and on the sides of the teeth are indicated on a strongly enlarged scale. In FIG. 6A, a positive grating structure is shown in a cross-sectional view, the individual ridges 30 being spaced apart some $1 m$. This structure may be used in any one of microstructures 20, 21, 28, or 29, or it may be provided on the tooth space bottom, e.g. in microstructures 23, 24, or 25.

In FIG. 6B, a negative grating structure is symbolically indicated whose recesses 31 are also spaced apart some $1 m$.

In FIG. 6C, a possible positive microstructure consisting of grating-like, curved ridges 32 is indicated in a perspective view.

In FIG. 6D, a possible negative microstructure consisting of grating-like, curved grooves 33 is indicated in a perspective view. This structure may e.g. be applied in microstructures 24 or 25.

Based on these few examples, it appears that a very wide range of variations both of the microstructures resp. of the arrangement of the microstructures on the individual teeth and on the tooth space bottoms, or only on the tooth space bottoms alone, and of the microstructures themselves is possible, depending on the state of the art with regard to the production of such microstructures. However, the production of microstructures is also applied especially in the manufacture of electronic chips and thus known in the art. In the production of such fine microstructures, the use of suitable methods such as lacquer or etching techniques is of great importance.

Figure 7:
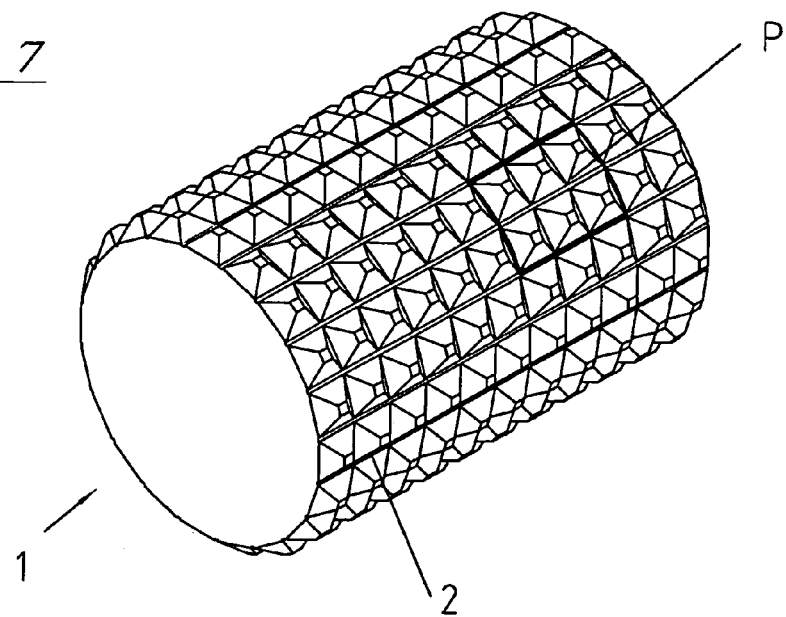
FIG. 7 shows the same portion of the embossing roll as FIG. 4.

FIG. 7 shows the same embossing roll section 1 as FIG. 4, including teeth 2 and portion P. The teeth of FIG. 8 comprise both macrostructures and microstructures, the term macrostructure referring to modifications of the tooth geometry while the term microstructure refers to alterations of the tooth surfaces.

Figure 8:
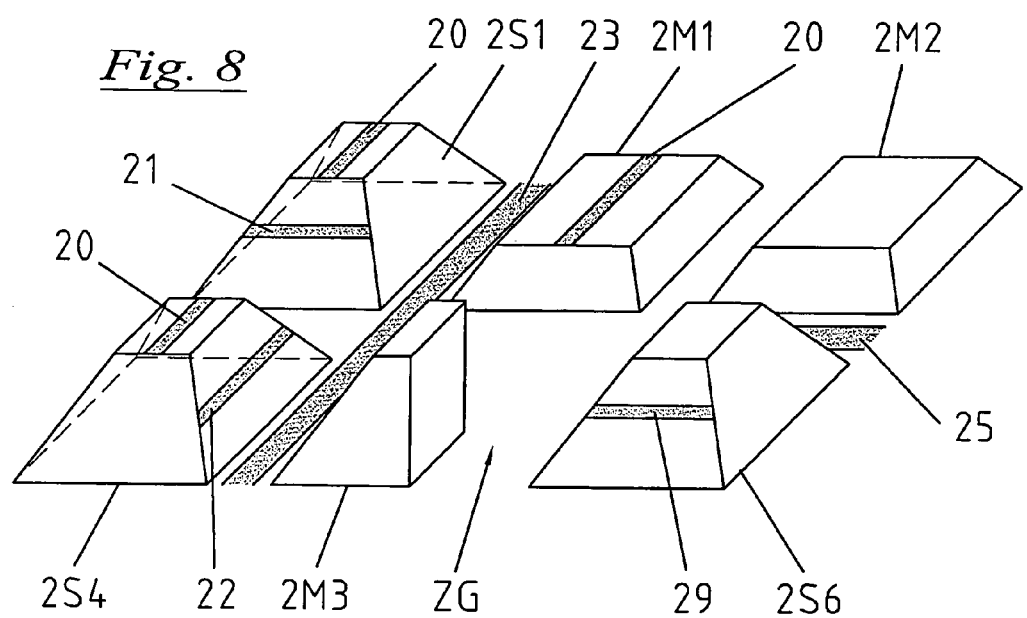
FIG. 8 shows an alternative embodiment of FIG. 5 where the teeth include macrostructures and superficial microstructures.

FIG. 8 shows three geometrically unaltered teeth 2S1, 2S4, and 2S6, however provided with microstructures as in FIG. 5, as well as the teeth 2M1, 2M2, and 2M3, where the letter "M" refers to macrostructures. The tooth 2M1 exhibits a stronger flattening than a normal tooth such as e.g. 2S1, the flattened portion being provided with a microstructure 20.

The tooth 2M2 only comprises a stronger flattening and is otherwise unaltered, while the tooth 2M3 has been reduced to half its width. It is understood that the teeth 2M2 and 2M3 may be provided with microstructures as well. The tooth space bottom may be treated also in the example of FIG. 8 and may comprise the same microstructure 23 as in FIG. 5 as well as a microstructure 25. The illustration of FIG. 8 results in an even greater variety of possible alterations of teeth, thereby allowing a very large variety of embossing patterns. It is also possible to use only the structures on the tooth space bottoms for embossing.

With regard to the production of the microstructures on the teeth and on the tooth space bottoms, some considerations will be taken into account. Thus, a material allowing the corresponding treatment and exhibiting a suitable structure will be chosen whose surface roughness does not interfere with the impression of the microstructures. In other words, only such basic materials may be chosen for the embossing roll whose grain size does not substantially disturb e.g. the integrity and the surface quality of such gratings. These materials can be selected by those skilled in the art, and the microstructures may be produced e.g. by lithographic engraving or by other subtractive or additive methods.

In the pin up-pin down configuration, it is possible not only to reduce the depth of the indentations according to the flattened portions of the teeth, but also to provide complementary macrostructures and/or microstructures in the indentations.

Figure 9:
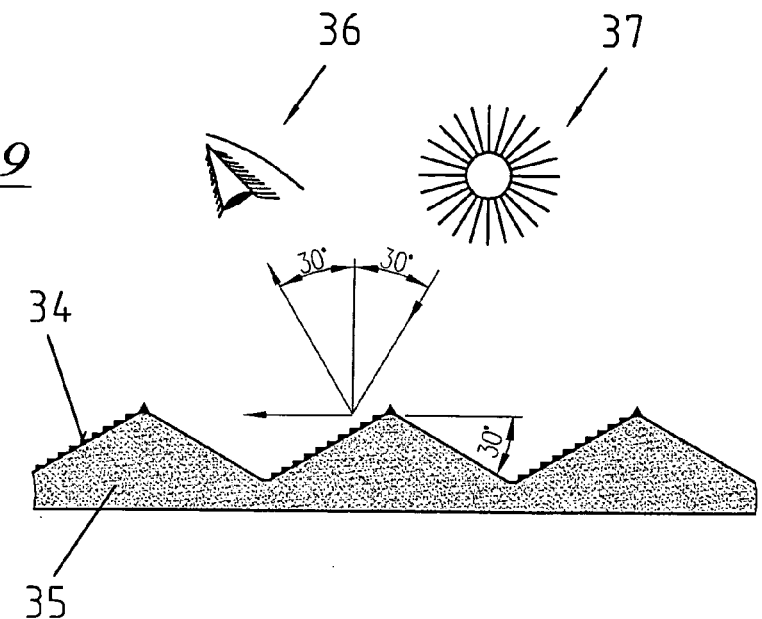
FIG. 9 is a schematic representation of a foil which has been embossed with the microstructures according to FIGS. 5 and 8.
Figure 10:
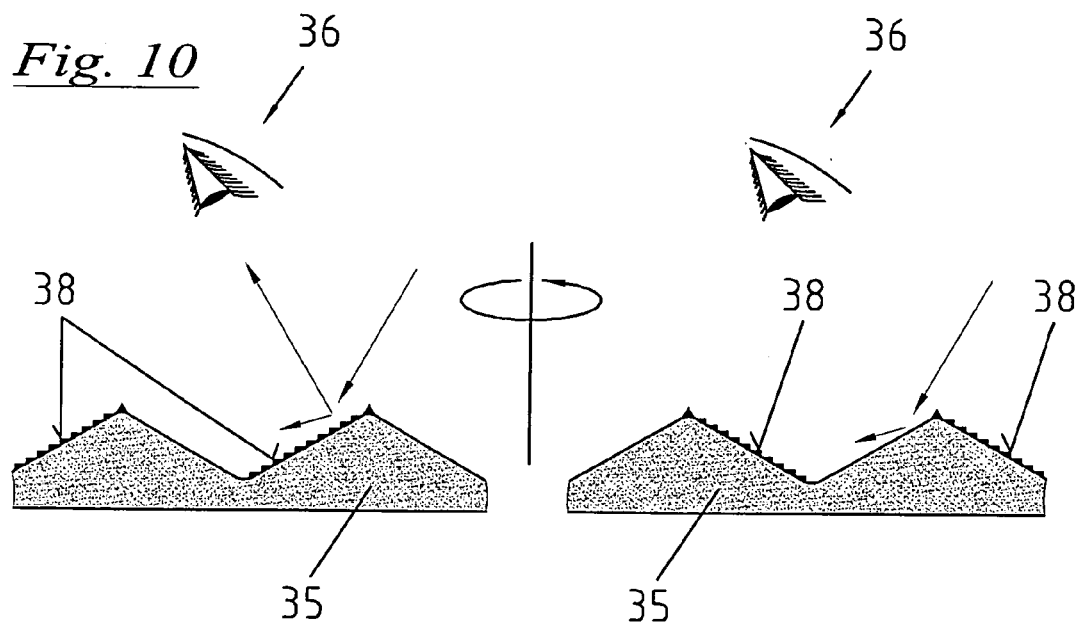
FIG. 10 illustrates the initial position and the position rotated by 180° of a structured foil.

In FIGS. 9 and 10, a macrostructure resp. microstructure embossed on a foil is shown in a schematized manner on a strongly enlarged scale, which structure allows to produce color effects. As embossing materials, the materials which are usual in the tobacco industry are used, such as e.g. aluminium paper, consisting of an aluminium layer of 6 $1 m$ and a fiber volume of 50 $1 m$, or metallized innerliners, essentially consisting of a paper fiber structure having a thickness of 10 to 100 $1 m$ and of a fine layer of vapor-deposited metal having a thickness of some 100 A which in turn is protected by a very fine layer of a synthetic material.

In the food packaging industry, still other materials are commonly used, such as e.g. multilayer materials comprising a layer structure composed of a metal foil which is embossed on its entire surface or on parts thereof, or of metallized synthetic foils, with an overlying single layer or multiple synthetic layers which is transparent in partial areas at least. The metal foils may e.g. be iron, steel, copper, silver, gold, and particularly aluminium foils. The synthetic layer may be transparent or transparent in partial areas and colored or gray. It may include a single layer or multiple layers while thermoplastics, polyamides, PVC, polypropylene, polyester and the like may be used.

Many factors are responsible for the quality of the embossing, e.g. the location and the kind of the applied microstructures, the paper sort and its metal coating, the specific pressure of the rolls at the embossing locations, etc.

In the example of FIG. 9, it is assumed that the flanks 34 of the embossed pyramidal structures on foil 35 are reflecting plane surfaces having an inclination of 30°. In order to produce color effects based on diffractive elements, a dominant direction of incidence of the light is required which together with the viewing angle determines the observed color.

FIG. 9 shows a possible configuration where the observer, symbolized by eye 36, maintains the foil in a horizontal position while viewing it under an angle of approx. 30° to the vertical direction. The light, symbolized by sun 37, impinges from the front under a dominant angle of 30°. According to the diffraction formula sin á=ë/Ë, for green light with ë=0.55 ìm, an optimum grating distance Ë?0.7 ìm results. A condition for the appearance of an utilizable color effect is that the diffractive effect, i.e. the angular dispersion, is greater than e.g. the diffuse dispersion due to the satinizing.

In FIG. 10, a difficult to reprode identification mark is represented where only certain flanks 38 of foil 35 are provided with gratings such that the color effect disappears when it is rotated by 180°.

Figure 11:
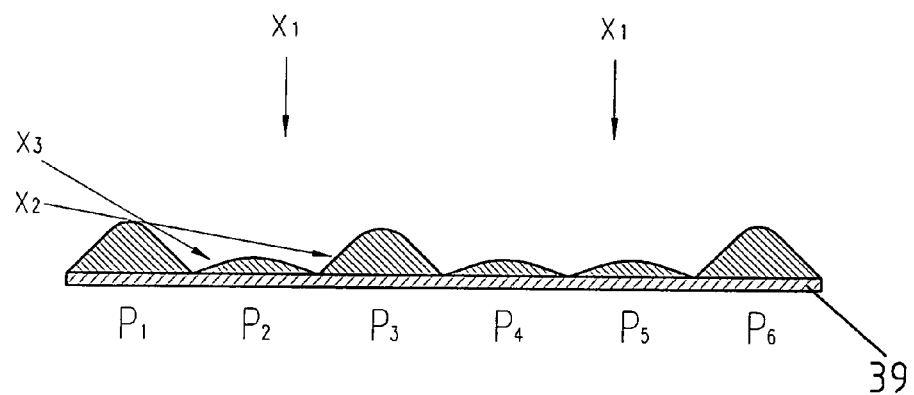
FIG. 11 is a sectional view of an embossed surface of a foil.

In FIG. 11, an example of a macrostructured foil 9 is illustrated. When viewed perpendicularly or under an acute angle, as symbolized by arrows X1 and X3, all pyramids P1 through P6 are visible. When viewed under a small angle, e.g. from the direction X2, the pyramids P2, P4, or P5 will gradually disappear, thereby allowing to achieve darkening effects.

Figure 12:
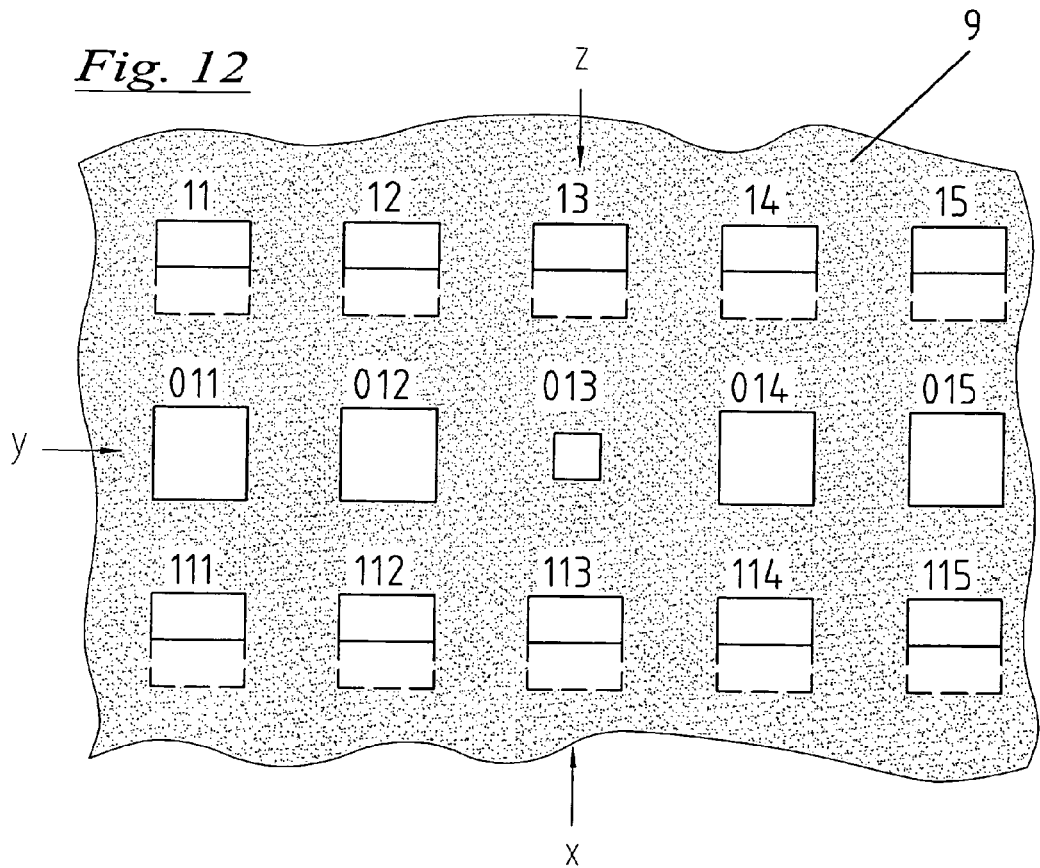
FIG. 12 is a schematic top view of an embossed surface of a foil with a plurality of effect-forming embossed patterns.

FIG. 12 shows a detail of a satinized foil surface 9 on which the letter H is formed as follows: impressions 11–15 and 111–115 are the result of teeth one lateral surface of which is provided with a microstructure according to the principle of FIG. 9. Impression 013 results from a macroscopically altered tooth, whereas the remaining impressions 011, 012, 014, and 015 are the result of unaltered teeth. Viewed from above, all impressions of the foil portion are visible as a satinized surface.

Viewed under an oblique angle from the direction Z, the letter H is entirely visible with two parallel, colored legs and a darkened connecting leg. However, when viewed from the directions X and Y, the letter H is not visible, but a darkened spot is noticeable at 013.

As indicated above, this technique allows a very large variety of embossed structures including patterns, letters, numbers and the like, while the hardly reproducible microeffects result in a hologram-like structure enabling the manufacturer to produce the most diverse security marks in one (single) mechanical embossing operation in situ and without using complicated technologies.

It follows from the preceding description that the application of microscopic structures in the submicrometer range and up to 30 micrometers, which are superimposed on the satinizing, allows hologram-like effects or contrasts to be produced in the mechanical embossing process which provide an unalterable indication of origin similarly to labels or seals including holograms, on one hand, and effectual decorations, on the other hand.

I claim:

1. Device for satinizing and embossing flat materials, comprising a first embossing roll including individual embossing teeth and satinizing teeth and at least one mating roll, said rolls being connected to a driving system and adapted to be driven individually or in common and to be resiliently pressed against one another, the individual embossing teeth of said embossing roll being flattened, and the embossing teeth being designed so as to produce in corresponding locations of said flat material during its passage through the rollers, embossed variable marks whose appearance varies according to at least one of a viewing angle of the observer, a kind of light source, and a position of the lighting source, wherein the embossing teeth which produce said variable marks have at least one of a different geometrical shape and surface than the satinizing teeth which are intended for satinizing, and wherein at least one of the surface of said embossing teeth and portions of a tooth space bottom of said embossing roll are provided with microstructures that are located in an ordered and predefined pattern on the at least one of the surface of said embossing teeth and portions of the tooth space bottom of said embossing roll.

2. The device of claim 1, wherein said microstructures include ridges or grooves arranged in the manner of a grating at a mutual distance of less than one micrometer and up to 30 micrometers.

3. The device of claim 1, wherein said geometrically different embossing teeth have a smaller height than remaining teeth.

4. The device of claim 1, wherein flank or edge shapes of said geometrically different embossing teeth differ from those of remaining teeth.

5. The device of claim 1, wherein said embossing teeth are provided on said driven embossing roll.

6. The device of claim 1, including two rolls, wherein said embossing roll comprises a toothing comprising individual teeth and said mating roll comprises a surface structure without individual teeth.

7. The device of claim 1, including two rolls followed by an additional roll, wherein said embossing roll comprises a toothing consisting of individual teeth and at least one mating roll comprises a surface structure without individual teeth.

8. The device of claim 6, wherein said mating roll is provided with rings.

9. The device of claim 1, wherein said rolls are mutually synchronized by a synchronizer.

10. The device of claim 1, wherein at least one of said mating rolls is adapted to move in at least one of the longitudinal direction of an axle and in a contact pressure direction and in a traveling direction of the foil, said movement being adjustable by spring force, by pneumatic, or by magnetic force.

11. The device of claim 1, wherein the device is of a pin up-pin down configuration, and wherein indentations on said mating roll have a smaller depth in accordance with said flattened teeth.

12. The device of claim 11, wherein said indentations comprise at least one of macrostructures and microstructures which are complementary to said embossing teeth.

13. The device of claim 1, wherein at least one of said rolls is contained in an exchangeable unit which is insertable in a bearing mount.

14. The device of claim 13, wherein said rolls are disposed in an exchangeable unit individually, in groups, or in common.

15. At least one of a metallized and reflecting packaging foil produced in the device of claim 1, said foil being satinized and provided with a microstructure in an ordered and predefined pattern on a satinized background whose intensity and color varies according to at least one of a viewing angle and a kind of the microstructure and a kind of lighting source and a position of the lighting source.

16. The packaging foil of claim 15, wherein the foil is a foil for packaging tobacco products.

17. A method for operating the device of claim 1, further comprising simultaneously satinizing and embossing said foil with the device.

18. The device of claim 7, wherein said mating roll is provided with rings.

19. The device of claim 1, wherein the microstructures of the device are adapted to produce at least one of an embossing and a satinizing having at least one of diffractive orders and colored phenomena.

20. The device of claim 1, wherein said microstructures include ridges or grooves arranged in the manner of a grating.

21. The device of claim 1, wherein the microstructures of the device are adapted to at least one of emboss and satinize the flat material to have a high diffractive efficiency.

22. The device of claim 1, wherein the microstructures include a grating having a grating distance of 1 to 3 micrometers at a viewing angle of 30 degrees.

23. The device of claim 1, wherein at least one tooth of the embossing teeth comprises:
- a linear microstructure extending across a truncated surface of the at least one tooth;
- a linear microstructure extending across a height of a longitudinal side of the at least one tooth; and
- a linear microstructure extending across a transversal side of the at least one tooth.

24. Device for satinizing and embossing flat materials, comprising:
- a drive system;
- a first embossing roll including individual embossing teeth and satinizing teeth; and
- at least one mating roll, wherein said rolls are connected to the drive system and adapted to be driven individually or in common and to be resiliently pressed against one another;
- wherein the individual embossing teeth of said embossing roll are flattened,
- wherein the embossing teeth are adapted to produce, in corresponding locations of said flat material during its passage through the rollers, recognizable embossed variable marks having an appearance that varies according to at least one of a viewing angle of the observer, a kind of light source, and a position of the lighting source,
- wherein the embossing teeth which produce said variable marks have at least one of a different geometrical shape and surface than the satinizing teeth which are intended for satinizing,
- and wherein at least one of the surface of said embossing teeth and portions of a tooth space bottom of said embossing roll are provided with microstructures that are located in an ordered and predefined pattern on the at least one of the surface of said embossing teeth and portions of the tooth space bottom of said embossing roll, the microstructures being adapted to produce, at least in part, the recognizable embossed variable marks.

25. The device of claim 24, wherein the microstructures of the device are adapted to produce at least one of an embossing and a satinizing having at least one of diffractive orders and colored phenomena.

26. The device of claim 24, wherein said microstructures include ridges or grooves arranged in the manner of a grating.

27. The device of claim 24, wherein the microstructures of the device are adapted to at least one of emboss and satinize the flat material to have a high diffractive efficiency.

28. The device of claim 24, wherein the microstructures include a grating having a grating distance of 1 to 3 micrometers at a viewing angle of 30 degrees.

29. The device of claim 24, wherein at least one tooth of the embossing teeth comprises:
- a linear microstructure extending across a truncated surface of the at least one tooth;
- a linear microstructure extending across a height of a longitudinal side of the at least one tooth; and
- a linear microstructure extending across a transversal side of the at least one tooth.

* * * * *